US010271641B2

(12) United States Patent
Rassat (10) Patent No.: US 10,271,641 B2
(45) Date of Patent: Apr. 30, 2019

(54) FURNITURE PEDESTAL SUPPORT

(71) Applicant: Attiture LLC, Minneapolis, MN (US)

(72) Inventor: David F. Rassat, Minneapolis, MN (US)

(73) Assignee: Attiture LLC, Minneapolis, MN (US)

( * ) Notice: Subject to any disclaimer, the term of this patent is extended or adjusted under 35 U.S.C. 154(b) by 0 days.

(21) Appl. No.: 15/970,555

(22) Filed: May 3, 2018

(65) Prior Publication Data

US 2018/0317646 A1 Nov. 8, 2018

Related U.S. Application Data

(60) Provisional application No. 62/501,233, filed on May 4, 2017.

(51) Int. Cl.
*A47B 13/02* (2006.01)
*A47C 7/00* (2006.01)
*A47B 91/00* (2006.01)
*F16B 12/44* (2006.01)

(52) U.S. Cl.
CPC .......... *A47B 13/023* (2013.01); *A47B 91/005* (2013.01); *A47C 7/004* (2013.01); *F16B 12/44* (2013.01); *A47B 2013/024* (2013.01)

(58) Field of Classification Search
CPC ......... A47B 13/023; A47B 13/02; A47B 3/06; A47B 91/005; A47B 2013/024; A47C 7/004; F16B 12/44; F16B 7/105; F16M 11/28
See application file for complete search history.

(56) References Cited

U.S. PATENT DOCUMENTS

| 1,421,398 | A | * | 7/1922 | Burchess | A47G 33/12 248/523 |
|---|---|---|---|---|---|
| 1,903,631 | A | | 4/1933 | Morrison | |
| 2,262,216 | A | * | 11/1941 | Eli | A47B 9/08 108/128 |
| 3,078,063 | A | * | 2/1963 | Frankl | A47B 13/023 108/150 |
| 3,151,830 | A | * | 10/1964 | Giacomini | A47C 3/24 108/150 |
| 3,194,189 | A | * | 7/1965 | Bailey | A47C 4/02 108/150 |
| 3,347,511 | A | | 10/1967 | Myers | |
| 3,499,625 | A | | 3/1970 | Froedge | |
| 3,742,870 | A | * | 7/1973 | Gusdorf | A47B 7/00 108/139 |
| 3,770,236 | A | * | 11/1973 | Marsh | A47C 3/34 248/408 |
| 3,829,049 | A | | 8/1974 | Hughes et al. | |

(Continued)

*Primary Examiner* — Anita M King
(74) *Attorney, Agent, or Firm* — Leydig, Voit & Mayer, Ltd.

(57) ABSTRACT

A furniture pedestal support for an article of furniture such as tables, chairs, desks or racks, which may be a fixed length or adjustable and features a tubular upright column member the lower end of which has longitudinal slots and the slots receive radially attachable and removable legs held in place by a removable end cap. The legs may be stored in the tubular support and confined by the end cap for compact shipment and storage. Other features include the manner of attachment of parts for assembly and disassembly without tools and variability of height adjustment capability.

11 Claims, 8 Drawing Sheets

(56) References Cited

U.S. PATENT DOCUMENTS

| | | | |
|---|---|---|---|
| 3,994,461 A | | 11/1976 | Dorantes |
| 4,010,922 A | * | 3/1977 | Heller ............... A47C 4/02 248/165 |
| 4,010,926 A | | 3/1977 | Carnahan |
| 4,653,710 A | * | 3/1987 | Dickison ........... A47B 13/023 108/150 |
| 4,667,605 A | | 5/1987 | Bastian |
| 4,807,837 A | * | 2/1989 | Gawlik ............. A61M 5/1415 211/196 |
| 5,020,752 A | | 6/1991 | Rizzi et al. |
| 6,182,583 B1 | | 2/2001 | Larson |
| 7,270,062 B1 | | 9/2007 | Larson |
| 9,259,081 B2 | | 2/2016 | Rassat |
| 9,486,068 B2 | | 11/2016 | Rassat |
| D805,878 S | | 12/2017 | Rassat |
| 2003/0006354 A1 | * | 1/2003 | Biles ................. B25H 3/006 248/354.1 |
| 2015/0122958 A1 | * | 5/2015 | Chen ................. A47C 7/004 248/158 |

\* cited by examiner

FURNITURE PEDESTAL SUPPORT

CROSS-REFERENCE TO RELATED APPLICATIONS

This patent application claims the benefit of U.S. Provisional Patent Application No. 62/501,233, filed May 4, 2017, which is fully incorporated herein by reference.

BACKGROUND OF THE INVENTION

The invention relates generally to pedestal supports for furniture, such as tables, chairs, desks, racks and the like. Such pedestal supports are widely known and used in the prior art. The various types of furniture pedestals typically include tubular columns or posts either fixed in length or telescopically adjustable to extend or collapse to allow a variety of heights for the furniture articles.

In addition, many forms of pedestal furniture items, particularly, outdoor patio or balcony furniture, have come in easily assembled and disassembled construction, mostly by hand, for compact shipment and storage. The basic tables, for example, include a top, a pedestal and three or more radially extending legs that form a base. Examples of such pedestal formats are illustrated in U.S. Pat. Nos. 3,994,461, 3,829,049 and 3,499,625.

OBJECTS OF THE INVENTION

It is a primary object of the instant invention to provide a furniture pedestal support of the foregoing type, which is easily assembled and disassembled, essentially by hand into a compact condition for shipment and storage, yet remains sturdy in structure when assembled and minimizes the storage area needed for packing, shipment and storage.

It is another object of this invention to provide a furniture pedestal constructed so as to allow the components to be fitted within each other upon disassembly to contain the components in the most compact form.

SUMMARY OF THE INVENTION

The foregoing objects of this invention are achieved in a furniture pedestal support in a first embodiment where there is an extendible and collapsible tubular column and a plurality of radially extending base legs, which upon disassembly can be stored within the column when disassembled. A second embodiment of the pedestal comprises a fixed selected length of column, which can receive the legs for shipment or storage. An end cap for the pedestal column either secures the base legs in position when assembled, or confines the legs within the column when stored.

BRIEF DESCRIPTION OF THE DRAWINGS

For the purpose of illustrating the invention, there is shown in the accompanying drawings exemplary forms, which are presently preferred, it being understood that the invention is not intended to be limited to the precise arrangements and implementation shown.

DETAILED DESCRIPTION OF PREFERRED EMBODIMENTS

Figure 1:
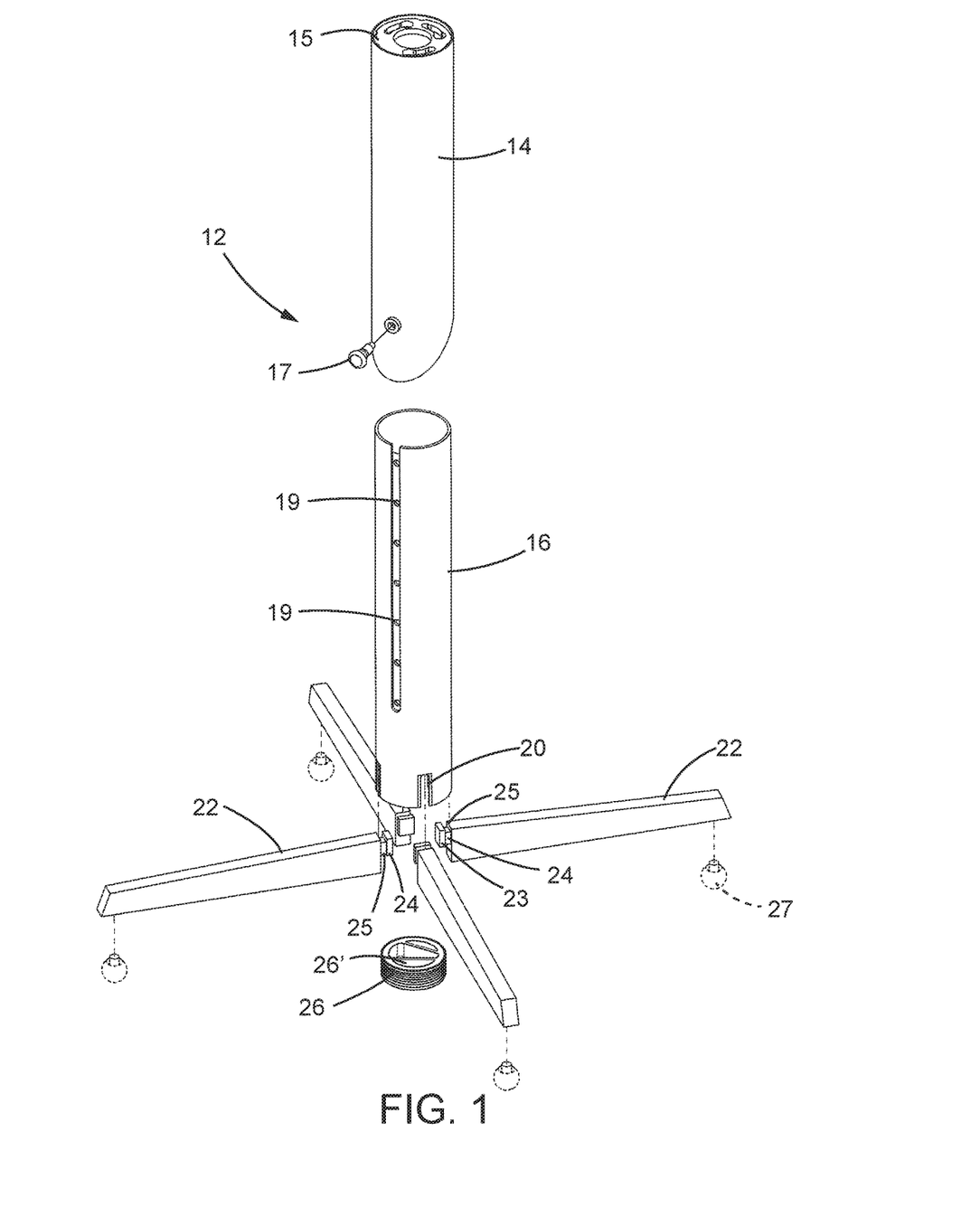
FIG. 1 is a side perspective and exploded view of a furniture pedestal support of the present invention, here the pedestal column is expandable and collapsible for different heights.
Figure 2:
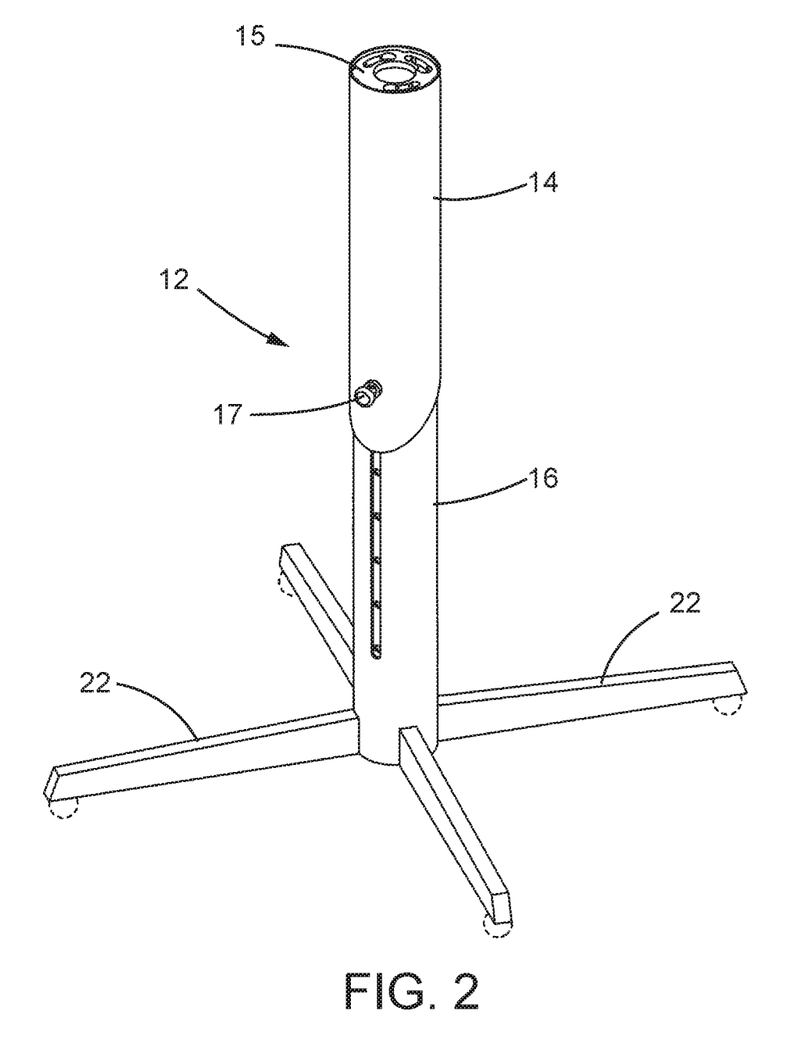
FIG. 2 is a side perspective view of the furniture pedestal support of FIG. 1 as assembled and in its upper position.

Referring to the drawings now in detail, wherein reference numerals have been used throughout the various figures to designate like elements, there is shown in FIGS. 1 and 2 a furniture pedestal designated generally as 12.

Figure 3:
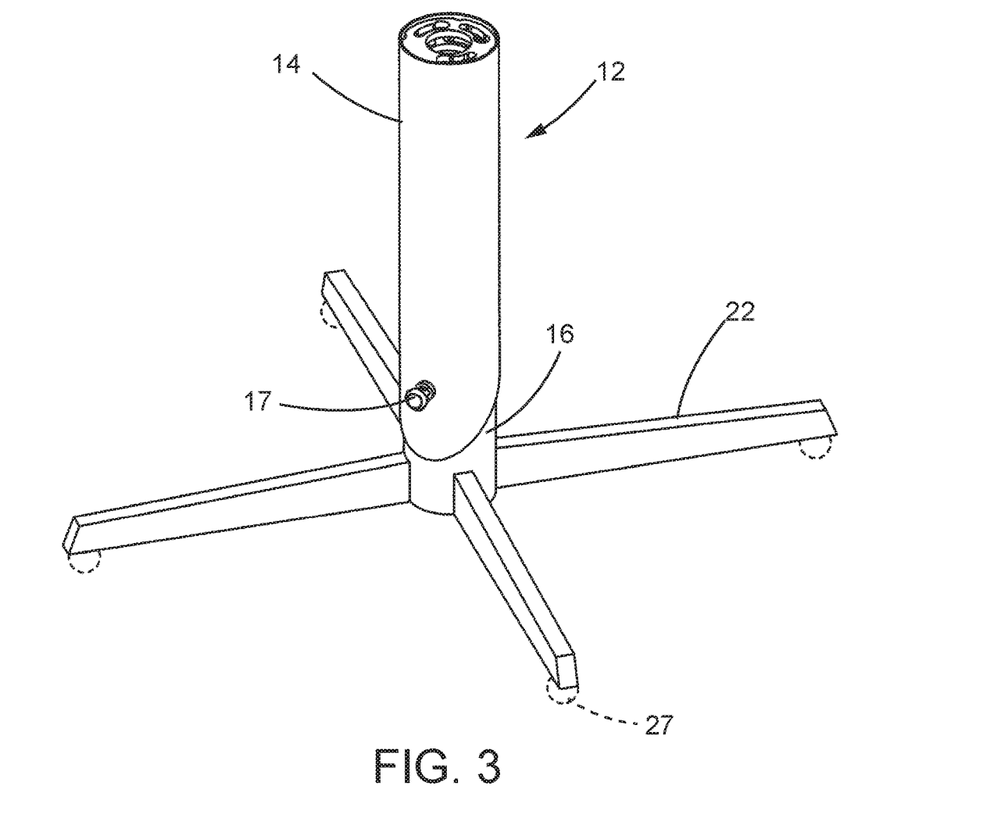
FIG. 3 is a side perspective view of the furniture pedestal support of FIG. 2 as assembled and in its lowest position.

In FIGS. 1-3, the furniture pedestal 12 includes an adjustable column with outer sleeve 14 and an inner tubular member 16. At the top of the sleeve 14 is a plate 15 for attaching to a table top, for example, not shown. The plate attachment is shown in detail in applicant's copending design application Serial No. 29/583,683, filed Nov. 8, 2016, and in U.S. Pat. Nos. 9,486,068 and 9,259,081. The sleeve 14 carries a retractable plunger device 17 that allows a pin end to engage with selected holes or openings 19 formed longitudinally along the outer surface of the tubular member 16.

At the lower end of the tubular member 16, there are longitudinal slots 20 spaced around the periphery. The number of slots 20 correspond to the number of radial legs 22 used as the base support for the pedestal column. Here, there are four legs shown.

Hence, these four radial legs 22 that attach to the slots 20 are positioned every 90° of the periphery of the tubular member 16.

At the inner ends of the legs 22 are lugs 24 formed by head 23 and with grooves 25 at the top and sides of the lugs 24. Thus, the grooved lugs slidably fit into the longitudinal slots 20 of the tubular member 16 and rigidly hold the legs in place. At the outer ends of the legs, levelers 27 may be provided.

Figure 5:
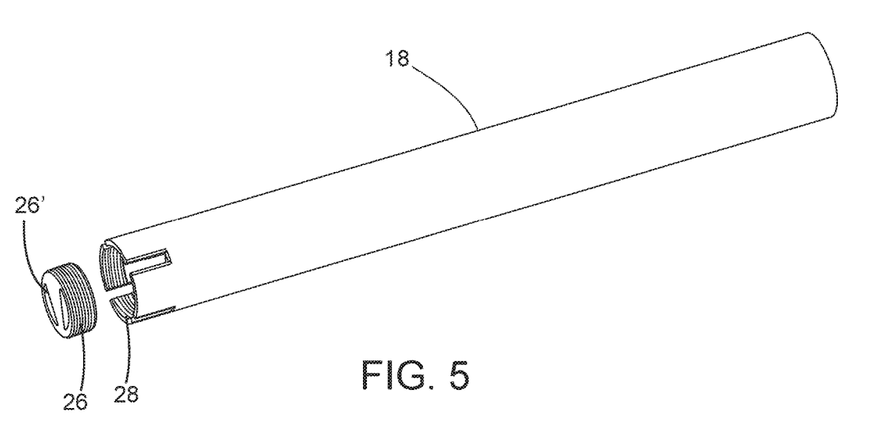
FIG. 5 is a perspective view of an exemplary fixed column showing the end cap exploded therefrom.

In order to capture and further hold the legs 22 in place, there is provided a threaded end cap 26, which can engage with internal threads 28 (such as shown in FIG. 5).

Referring to FIGS. 2 and 3, it can be seen that in the adjustable embodiment of the pedestal column, the height can be selectively adjusted and positioned with the retractable plunger 17 and holes 19 such that in the case of using the pedestal for a table, it could be set at cocktail table height or dining table height as even bar or café table height.

Figure 4:
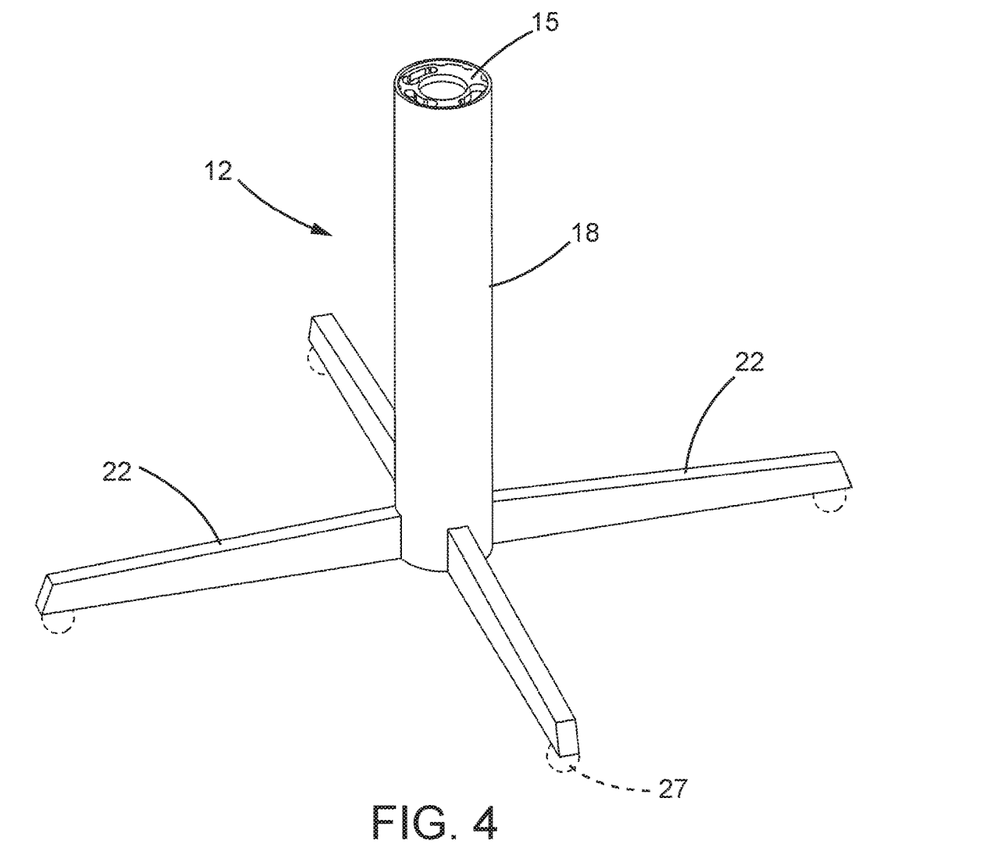
FIG. 4 is a perspective view of a furniture pedestal of the present invention with an exemplary fixed column.

Referring to FIG. 4, there is shown an exemplary furniture pedestal with a column that is a fixed single piece tubular member 18. All other components and structures remain the same as previously discussed so one can select a single length of the tubular member 18 for a desired use and only use it that way or procure other lengths to provide different heights.

Figure 6:
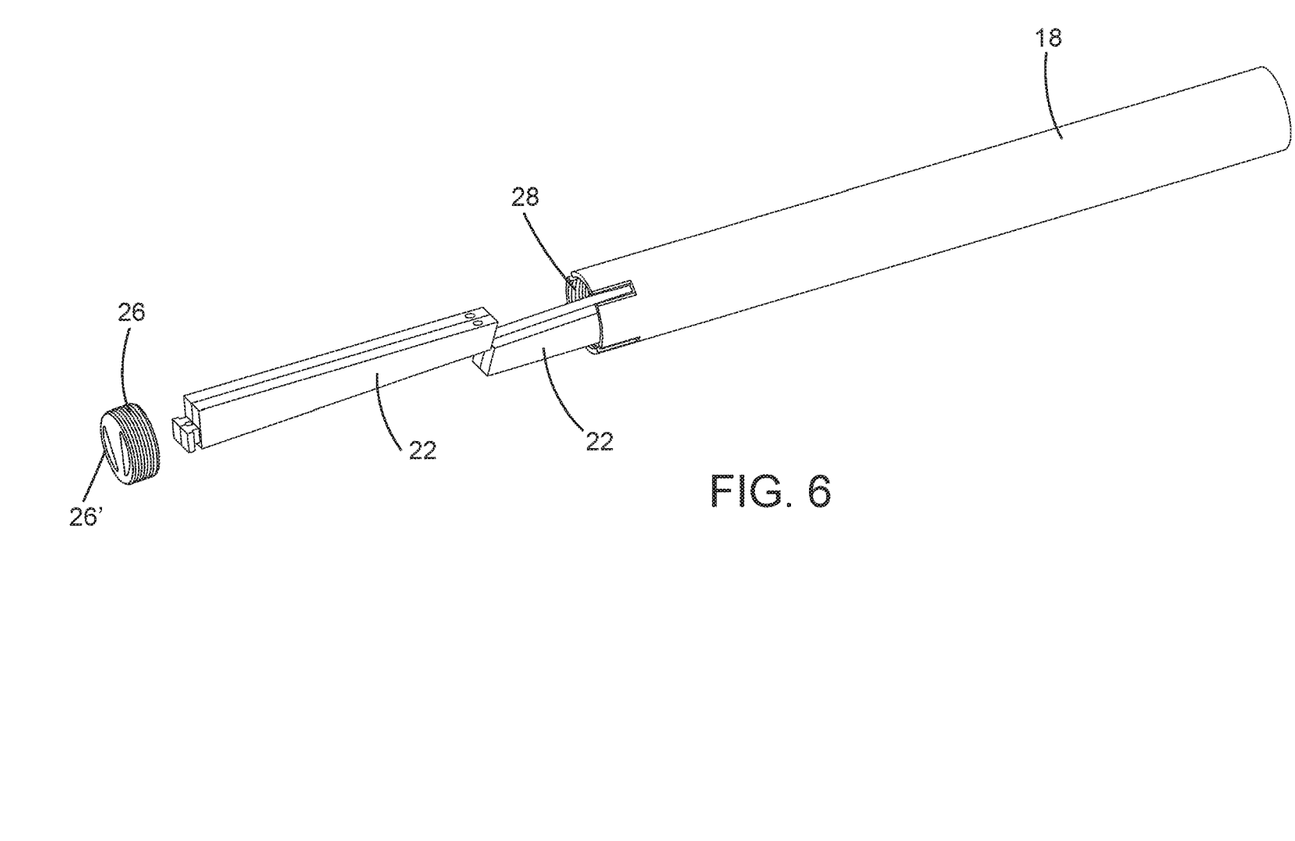
FIG. 6 is a perspective exploded view of a fixed column with the stored legs partially removed.
Figure 7:
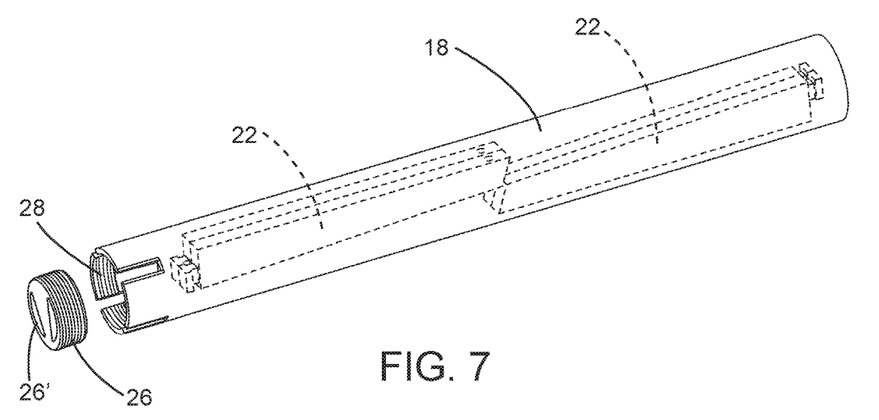
FIG. 7 is a perspective view as in FIG. 6 showing the stored legs in position.

Referring to FIGS. 5 and 6, conjointly, there is shown in connection with a fixed pedestal column 18, as an example, that the end cap can be removed even by hand with finger openings 26' and the legs 22 then can be inserted or removed from the tubular column. FIG. 7 shows the legs as they would be in storage containment and retained when the end cap 26 is screwed in place.

While applicant prefers that the construction of the end cap 26 with external threads and the pedestal tubular member 18 is provided with complementary internal threads along with provision for enabling the securement and removal of the end cap easily by hand without tools, alternative fastening means can also be provided such as bayonet-type attachments, or friction operating end caps, or strong majestic attraction where appropriate materials are used with the components (not shown).

Figure 8:
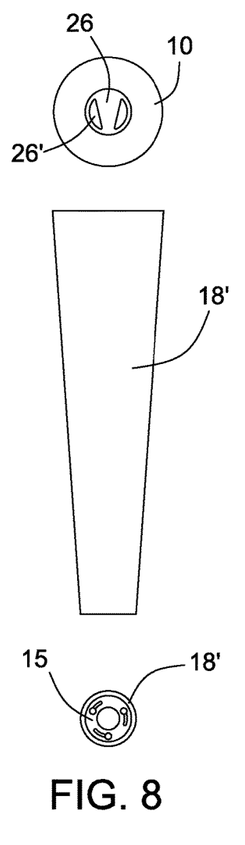
FIGS. 8-10 are composite drawings of a bottom view, side view and top view for exemplary pedestal columns of varying shapes other than straight tubular.
Figure 9:
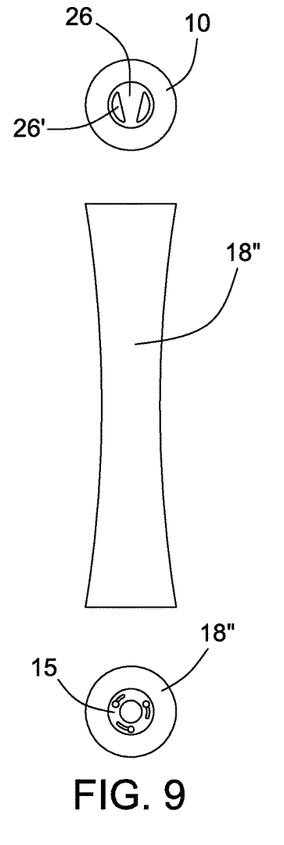
Figure 10:
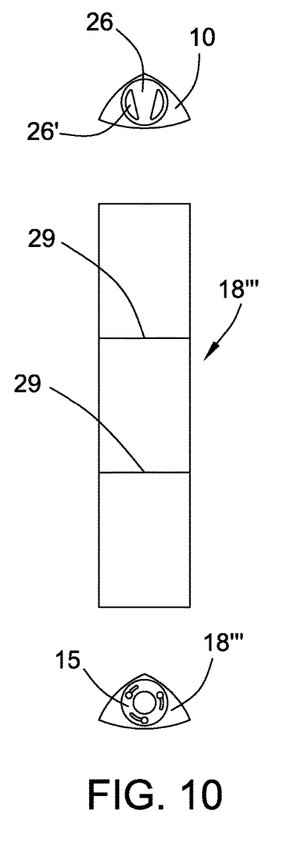

In addition, while the preferred and essential features of the present invention are the capability of packing and storing the legs within the pedestal column, it will also be appreciated that, as shown in FIGS. 8-10, the columns 18 can be provided with other shapes either geometrical in elevational view as in FIGS. 8-9, or in geometrical cross-sectional view such as in FIG. 10, where the shape is other than round in cross-section 18', 18'', 18'''. The examples shown in these FIGS. 8-10 are with respect to fixed length, one-piece columns. However, it is also contemplated that the columns can be expandable or collapsible with multiple modular parts or sections, or sleeve additions as exemplary, shown in FIGS. 1-3.

The present invention may be modified or changed without departing from the spirit or essentials, according to the appended claims.

The invention claimed is:

1. A furniture pedestal support for an article of furniture, comprising at least one tubular upright member, a plurality of legs adapted to be removably attached radially to a lower end of said tubular member, said tubular member lower end having a corresponding number plurality of longitudinal slots around its periphery adapted to receive one end of the legs by a lug formed at the inner end of each of the legs, said lugs being constructed to be slidably captive within the longitudinal slots, an upper end of said tubular member having a plate for attachment to said furniture article, said lower end of the tubular member being adapted to receive an end cap which serves to hold the legs attached to the tubular member in their radial disposition when assembled and said end cap can be removed for release of the legs and then allow the legs to be stored within the tubular member for shipment or storage, followed by replacement of the end cap to contain the legs within the tubular member.

2. The furniture pedestal support as claimed in claim 1, wherein the tubular member carries a tubular sleeve including means for adjusting the length of the pedestal support for providing various heights of the furniture article.

3. The furniture pedestal support as claimed in claim 2, wherein said sleeve carries a retractable plunger and the tubular member has a plurality of longitudinal holes to receive the plunger at a selectable number of stop positions, and said sleeve member carries said furniture article attachment plate.

4. The furniture pedestal support as claimed in claim 1, wherein said end cap includes external threads and said tubular member lower end includes internal threads adapted to be threadably engaged by said external threads on said end cap.

5. The furniture pedestal support as claimed in claim 1, wherein said tubular member is round in cross-section.

6. The furniture pedestal support as claimed in claim 1, wherein there are four legs and said longitudinal slots in said tubular member are disposed at 90° angular positions.

7. The furniture pedestal-support as claimed in claim 1, wherein said legs include levelers at outer ends thereof.

8. The furniture pedestal support as claimed in claim 1, wherein said end cap includes finger gripping openings for attachment and removal by hand.

9. The furniture pedestal support as claimed in claim 1, wherein the cross-section is geometrical.

10. The furniture pedestal support a claimed in claim 1, wherein the tubular member in elevational view is geometrical.

11. The furniture pedestal support as claimed in claim 1, wherein said tubular member is modular and made up of sections for providing different heights.

* * * * *